(12) United States Patent
Shah

(10) Patent No.: US 7,890,391 B2
(45) Date of Patent: Feb. 15, 2011

(54) SYSTEM AND METHOD FOR IMPLEMENTING A REVENUE RECOGNITION MODEL

(75) Inventor: Jaideep J. Shah, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 11/619,446

(22) Filed: Jan. 3, 2007

(65) Prior Publication Data
US 2007/0168209 A1 Jul. 19, 2007

Related U.S. Application Data

(60) Provisional application No. 60/759,832, filed on Jan. 17, 2006.

(51) Int. Cl.
*G07B 17/00* (2006.01)
(52) U.S. Cl. .................. 705/30; 705/1; 705/7; 705/14; 705/26; 705/33; 705/35; 705/38; 705/37; 705/40; 705/42; 705/39; 705/4
(58) Field of Classification Search .................. 705/30
See application file for complete search history.

(56) References Cited

U.S. PATENT DOCUMENTS

| | | | |
|---|---|---|---|
| 6,532,465 B2 * | 3/2003 | Hartley et al. ................. 707/10 |
| 2002/0133503 A1 * | 9/2002 | Amar et al. ............... 707/104.1 |
| 2003/0061158 A1 * | 3/2003 | Guy et al. ...................... 705/39 |
| 2003/0177016 A1 * | 9/2003 | Lawhorn et al. ................ 705/1 |
| 2004/0039916 A1 * | 2/2004 | Aldis et al. .................. 713/177 |
| 2004/0117283 A1 * | 6/2004 | Germack ...................... 705/35 |
| 2005/0209876 A1 * | 9/2005 | Kennis et al. ................... 705/1 |
| 2005/0222929 A1 * | 10/2005 | Steier et al. ................... 705/35 |
| 2006/0229896 A1 * | 10/2006 | Rosen et al. ................... 705/1 |

OTHER PUBLICATIONS

Boulianne, Emilio. The impact of procurement card usage on cost reduction, management control, and the managerial audit function. Managerial Auditing Journal, v20n6, p. 592-604, 2005.*
"Statement of Position 97-2 Software Revenue Recognition," ACC Section 10,700, 56 pages, Oct. 27, 1997.
"SEC Staff Accounting Bulletin: No. 101-Revenue Recognition in Financial Statements," Securities and Exchange Commission, 24 pages, Dec. 3, 1999.
"Staff Accounting Bulletin No. 104," Securities and Exchange Commission, 81 pages, Dec. 17, 2003.

* cited by examiner

*Primary Examiner*—F. Zeender
*Assistant Examiner*—Fawaad Haider
(74) *Attorney, Agent, or Firm*—Baker Botts L.L.P.

(57) ABSTRACT

A system and method for implementing a revenue recognition model in an automated environment includes receiving rules, over a communications network, associated with an entity. Information associated with a transaction is received, and one or more automated processes are implemented to determine whether revenue from the transaction is recognizable.

17 Claims, 13 Drawing Sheets

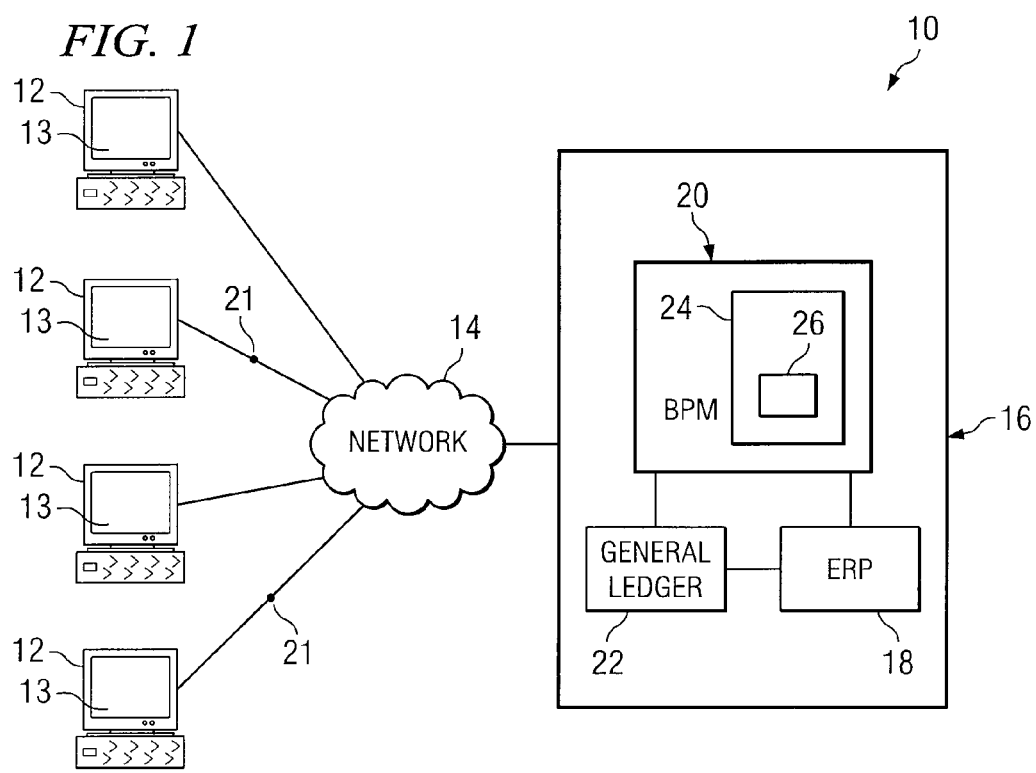
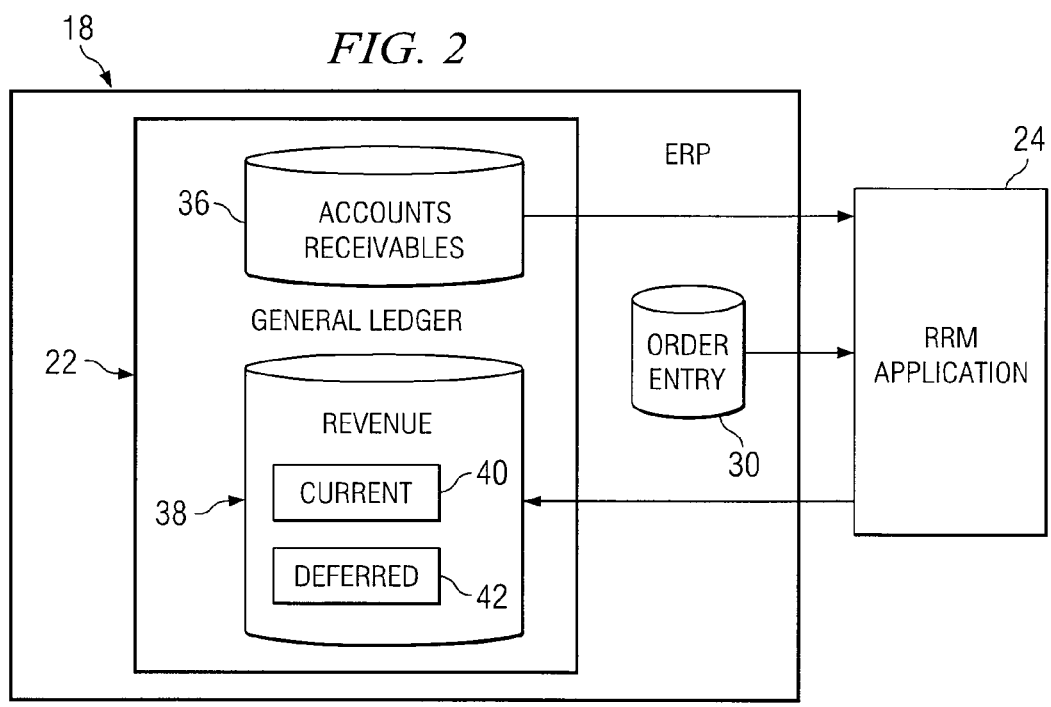

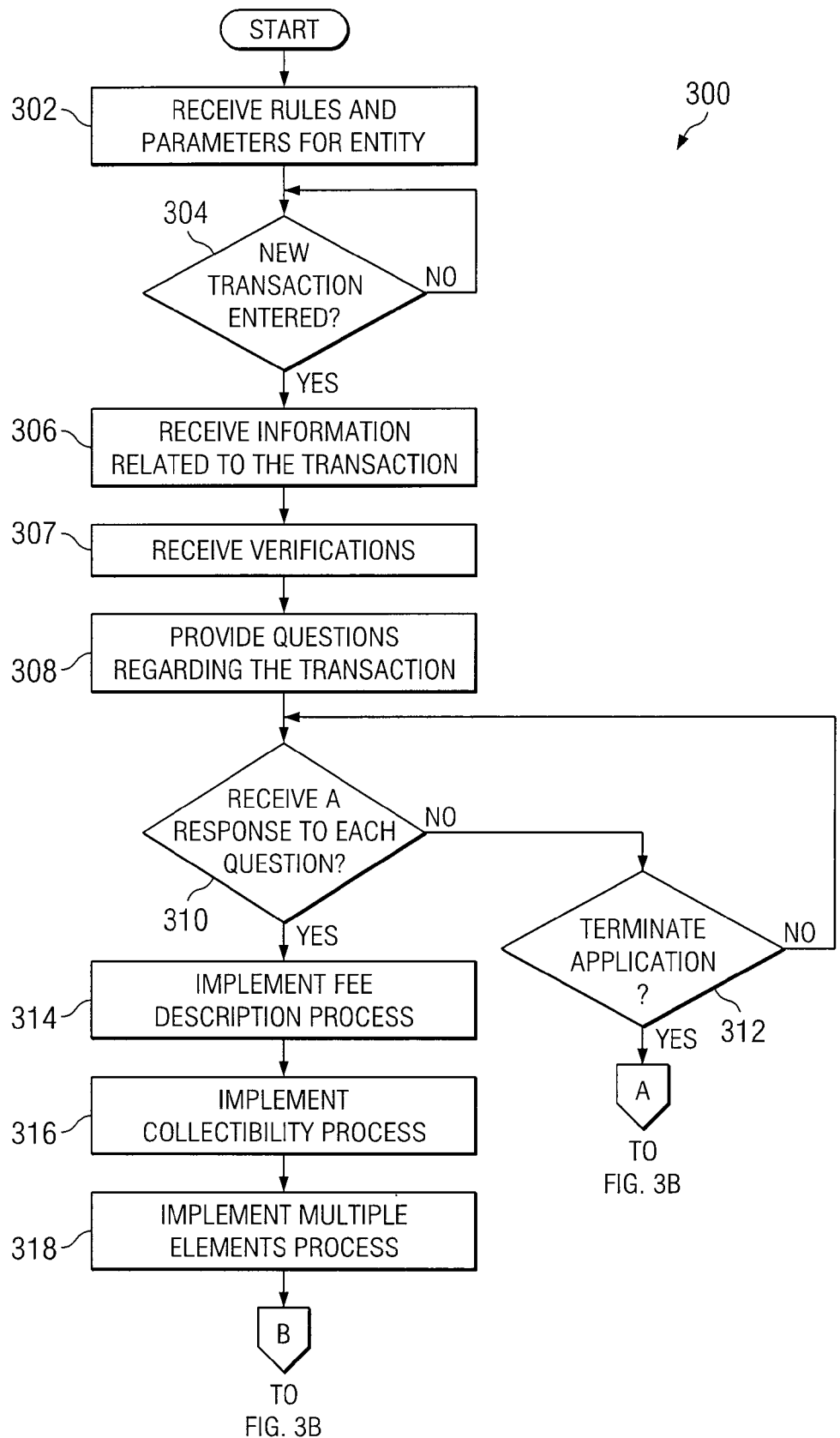

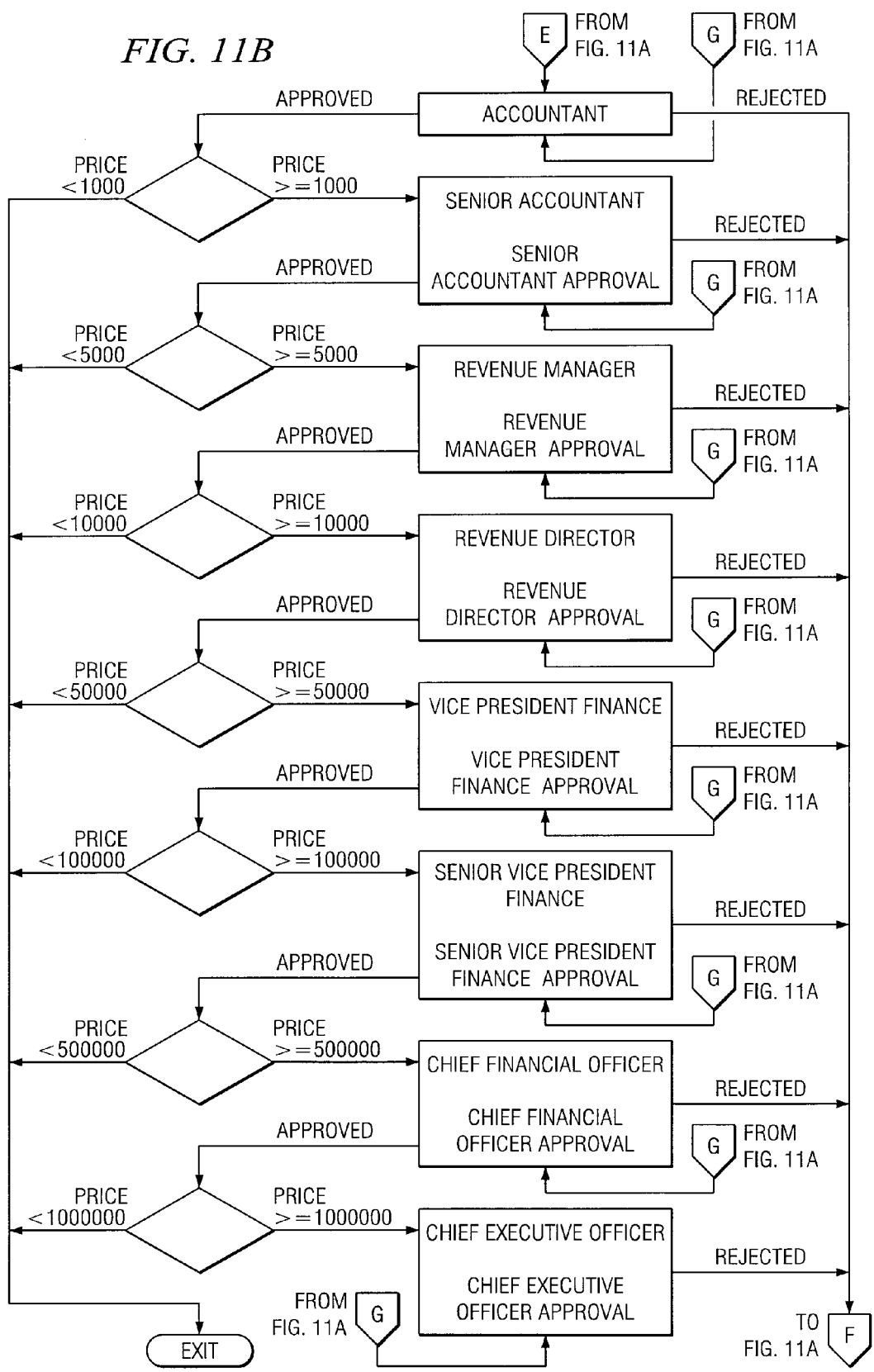

SYSTEM AND METHOD FOR IMPLEMENTING A REVENUE RECOGNITION MODEL

RELATED APPLICATION

This patent application claims priority from Patent Application Ser. No. 60/759,832, filed Jan. 17, 2006 entitled REVENUE RECOGNITION MODEL.

TECHNICAL FIELD

This invention relates generally to accounting services, and more specifically, to a system and method for implementing a revenue recognition model.

BACKGROUND

The accounting and financial industries are always changing and evolving. New rules, regulations, and procedures to improve reporting have burdened the daily tasks of professionals. Conventionally, professionals expend extensive manual effort to ensure compliance with accounting rules, regulations, and procedures.

SUMMARY OF THE DISCLOSURE

In accordance with the present invention, disadvantages and problems associated with previous techniques for accounting services may be reduced or eliminated.

According to one embodiment of the present invention, a system and method for implementing a revenue recognition model in an automated environment includes receiving rules, over a communications network, associated with an entity. Information associated with a transaction is received, and one or more automated processes are implemented to determine whether revenue from the transaction is recognizable.

Certain embodiments of the invention may provide one or more technical advantages. A technical advantage of one embodiment includes decreasing the manual effort of professionals to comply with accounting rules, regulations, and procedures by providing a revenue recognition model in an automated environment. Another technical advantage of an embodiment includes providing a series of steps that allow for the proper classification and recognition of revenue for companies. Therefore, a user may need to input specific, limited information into the system, and the revenue recognition model determines whether revenue should be recognized without the user having to expend extensive manual effort.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating a system for implementing a revenue recognition model;

FIG. 2 is a block diagram illustrating a configuration of an enterprise resource planning module;

DETAILED DESCRIPTION OF THE DRAWINGS

Figure 3B:
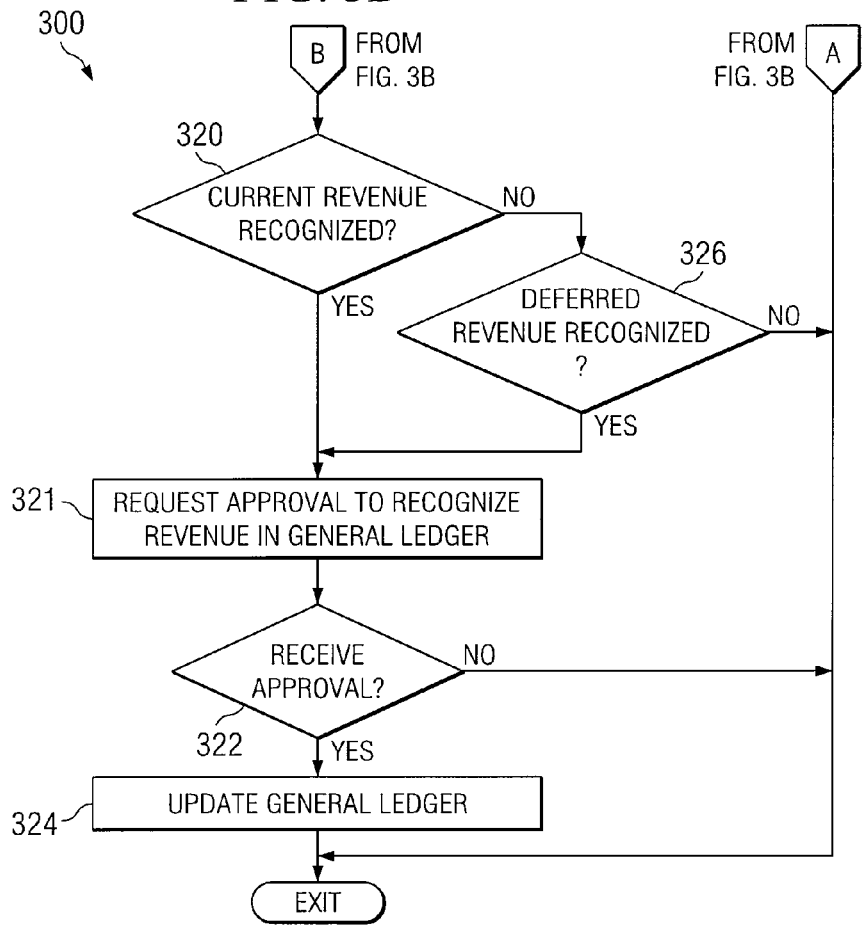
FIG. 3 is an overall flowchart illustrating an implementation of the revenue recognition model.

Embodiments of the present invention and its advantages are best understood by referring to FIGS. 1 through 12 of the drawings, like numerals being used for like and corresponding parts of the various drawings.

FIG. 1 illustrates a system 10 for implementing a revenue recognition model (RRM) for an entity. System 10 includes endpoints 12 that communicate over a network 14 with subsystem 16. During communication with endpoints 12, subsystem 16 implements the RRM to facilitate accounting services.

System 10 facilitates implementation of the RRM for an entity, such as a business. The entity participates in transactions with customers. A transaction may include a sale, lease, or license of computer software or any other suitable transaction involving a product and/or service related to computer software. In an embodiment, the transaction includes products and/or services for customers that may be delivered over a period of time. The products and/or services provided to the customer may contain other bundled products and/or services. Bundled products include any suitable types of products that may be combined, such as hardware and software with continued licensing or maintenance. Bundled services include any suitable types of services that may be combined, such as training and installation. Customers include resellers, distributors, value-added resellers (VARs), end users, or any suitable customer. Entities may include companies or organizations in the software, technology, or consulting industries or any other suitable industry or endeavor that may implement the model.

Rules to recognize revenue are determined by the Securities and Exchange Commission (SEC). The SEC provides these rules through various regulations passed, such as Staff Accounting Bulletin Nos. 101 and 104. The American Institute of Certified Public Accountants (AICPA) has determined the Statement of Position (SOP) 97-2, which also includes rules to recognize revenue. SOP 97-2 governs the recognition of revenue for transactions involving computer software. According to Generally Accepted Accounting Principles (GAAP), an entity properly recognizes revenue for a transaction when the transaction meets the following five minimum requirements: (1) an arrangement or contract exists, (2) delivery of the product has occurred or services have been rendered, (3) the price is fixed or determinable, (4) collectibility is reasonably assured, and (5) multiple-element arrangements are defined. The RRM automates several decision points in the above-identified areas and provides a final authorization to improve an entities' ability to recognize revenue and properly record a transaction as current revenue on an income statement or as deferred revenue on a balance sheet. Deferred revenue is a liability account for customer-payment received, but not yet earned by the entity. The entity may earn the deferred revenue over time as it fulfills all of the obligations. Only when the entity actually earns the revenue does the revenue become current revenue.

According to the illustrated embodiment, system 10 includes endpoints 12 that communicate with each other and subsystem 16 through network 14. For example, endpoints 12 communicate with subsystem 16 to facilitate the implementation of the RRM. Endpoints 12 may send any suitable signal to verify and approve processes implemented by the RRM. For example, endpoints 12 may send and receive data signals, audio signals, video signals, or any combination of the preceding to communicate in system 10. Endpoints 12 may support any suitable communication protocol to facilitate communication with network 12 and subsystem 16.

Endpoints 12 include any suitable hardware and/or software to communicate in system 10. Endpoints 12 may include, for example, a personal computer, a laptop, or any other suitable device. Endpoints 12 also include any suitable display 13 that displays information generated by the RRM. For example, display 13 includes a monitor, a screen, or any other suitable display that displays information to a user. Through display 13, the user may interact with the execution of the RRM using any suitable interface, such as a keyboard or a mouse. For example, endpoints 12 provide verifications 21 to subsystem 16. Verifications 21 verify information about a transaction. Generally, endpoints 12 execute financial or accounting software that allows users to input information, perform calculations, run repots, or engage in any other suitable financial or accounting activity. For example, endpoints 12 may include personal computers in an accounting department, point-of-sale (POS) devices, servers, or other computing and/or communicating device at one or more locations.

Network 14 allows endpoints 12 to communicate with other endpoints 12, networks 14, or subsystem 16. Network 14 may include a local area network (LAN), a wide area network (WAN), or any other public or private data network, a local, regional, or global communication network such as the Internet, an enterprise intranet, other suitable wireline or wireless communication link, or any combination of the preceding. Network 14 may include any combination of gateways, routers, access points, and any other hardware and/or software that may implement any suitable protocol or communication.

Subsystem 16 facilitates the provision of accounting services in system 10 by communicating with endpoints 12. Subsystem 16 includes information about an entity that allows for the RRM to be applied to the information. Subsystem 16 may include any suitable hardware and/or software to facilitate the provision of accounting services. Subsystem 16 may refer to any server, hub, switch, router, gateway, or other suitable network component(s) that communicates information with endpoints 12. In other embodiments, the functionality of subsystem 16 may be included in endpoints 12, and each endpoint 12 may implement the RRM.

In the illustrated embodiment, subsystem 16 implements the RRM using an enterprise resource planning module (ERP module) 18 and a business process manager module (BPM module) 20. The results of the RRM are provided to general ledger 22. BPM module 20 includes revenue recognition model application (RRM application) 24 that implements the RRM. Subsystem 16 may include any suitable module or combination of modules that provide for implementation of the RRM.

ERP module 18 represents any suitable application that facilitates accounting services. ERP module 18 includes any suitable hardware and/or software having business rules and parameters associated with the entity to use in the RRM. The rules and parameters are entity-defined and may be changed at any suitable time. Exemplary rules and parameters include: the entity's accounting year, a list of personnel authorized to verify certain information, standard shipment terms, standard payment terms, standard customer acceptance terms, or a percentage price discount threshold. In an embodiment, ERP module 18 facilitates revenue accounting and determines timing of revenue. For example, ERP module 18 may include commercial software, such as PEOPLESOFT, PEACHTREE, or any other suitable accounting, financial, or business application.

BPM module 20 represents an application that interacts with ERP module 18 and general ledger 22. BPM module 20 includes any suitable hardware and/or software to manage business processes. For example, BPM module 20 allows a user to implement business processes to improve efficiency. As another example, BPM module 20 allows a user to integrate existing business infrastructure. BPM module 20 may include any suitable application, such as the Interstage® Business Process Manager™ platform sold by Fujitsu® Limited.

In the illustrated embodiment, BPM module 20 includes RRM application 24 that executes processes to implement the RRM. RRM application 24 includes any suitable hardware and/or software that inputs, analyzes, ascertains, determines, and records the proper amount of current and deferred revenue in an automated environment based on accounting and/or financial data generated or processed in system 10. In the illustrated embodiment, RRM application 24 includes questions 26 presented to endpoints 12 that allow RRM application 24 to receive information about a transaction.

RRM application 24 also estimates and schedules the exact amounts of deferred revenue by future accounting periods. RRM application 24 interacts with ERP module 18 to retrieve information to use in implementing the RRM. For example, financial parameters are identified in ERP module 18 and RRM application 24 retrieves the information from ERP module 18. RRM application 24 may include any suitable process or number of processes that provide for the implementation of the RRM. RRM application 24 may be customized in any suitable manner to meet the specific needs of the entity. For example, RRM application 24 may include reminders specific to the entity.

As discussed above, endpoints 12 include a display 13 to display information. RRM application 24 may tailor the information to be displayed on display 13 to correspond to different job functions within the entity. For example, the information displayed on display 13 may correspond to job functions in the following areas: customer service, account management, sales management, credit management, and/or technical services.

General ledger 22 interacts with ERP module 18 and BPM module 20. General ledger 22 is any suitable hardware and/or software that include financial information about the entity. General ledger 22 may include the revenue account of the entity and the deferred revenue account. For example, if RRM application 24 determines to recognize revenue for a transaction, general ledger 22 receives the output of RRM application 24 and includes the revenue in the appropriate account, either the current revenue account or the deferred revenue account.

In operation, ERP module 18 receives rules and parameters regarding the entity from a user. When a transaction occurs, RRM application 24 may be executed to determine whether to recognize revenue for the transaction. Endpoints 12 may provide verifications 21 to subsystem 16 to verify information about the transaction. A series of questions 26 regarding the transaction are presented to the user. Questions 26 may be automatically generated when the transaction occurs, at the time of book entry, or at any suitable time. RRM application 24 uses the responses to determine whether to recognize revenue. In an embodiment, questions 26 may contain simple true/false questions that pertain to a specific line item within a transaction. For example, questions 26 may include the following: did the customer accept the product, does the customer have the right to use the product, is the customer the end-user, are there special payment terms, or any suitable question that provides for determining information about the transaction. Certain responses may trigger more detailed questions. System 10 contemplates any number, type, and level of questions presented to the user regarding a transaction to implement the RRM.

If RRM application 24 does not receive an answer within a specified period of time, RRM application 24 may initiate automatic timers to remind the user to provide an answer and to allow the process to proceed. The timer may be programmed to repeat question 26 on any suitable basis, such as hourly, daily, or weekly until resolved. Because the process does not continue until RRM application 24 has the necessary information, unauthorized or premature recording of revenue is ensured not to occur and the rules and parameters of the entity are followed while enabling an accurate recording of revenue.

When questions 26 are answered, RRM application 24 implements additional processes and provides an output, which is current revenue and/or deferred revenue from the transaction. An authorized user may review and approve the output of RRM application 24. General ledger 22 records the current and/or deferred revenue in the appropriate account when RRM application 24 receives approval.

Modifications, additions, or omissions may be made to system 10 in FIG. 1. For example, subsystem 16 may include any suitable component or module that facilitates the provision of accounting services to the entity. As another example, ERP module 18 may include general ledger 22 rather than including general ledger 22 in a separate module. As yet another example, BPM module 20 may receive rules, parameters, and financial data from a user, rather than interacting with ERP module 18. Moreover, the operations of system 10 may be performed by more, fewer, or other components. The components of system 10 may be integrated or separated according to particular needs. Any suitable logic comprising software, hardware, other logic, or any suitable combination of the preceding may perform the functions of system 10.

FIG. 2 is a block diagram illustrating a configuration of ERP module 18. ERP module 18 includes databases that store information for RRM application 24 to retrieve and use in determining whether to recognize revenue. In the illustrated embodiment, ERP module 18 includes an order entry database 30 and a general ledger 22, which further includes accounts receivable (A/R) database 36, revenue database 38, and other suitable databases that include accounting information of the entity.

Order entry database 30 stores information for transmission to RRM application 24. The information in order entry database 30 includes transactions of the entity. The transactions are populated manually or automatically as the entity accounts for a transaction for products and/or services. Order entry database 30 may organize the transactions in any suitable format. Order entry database 30 includes any suitable database operable to store information.

As mentioned above, general ledger 22 includes A/R database 36 and revenue database 38. General ledger 22 represents any suitable accounting database that includes a summary of all transactions that occur in the entity, such as assets, liabilities, expenses, revenue, losses, gains, and owner's equity.

A/R database 36 stores data regarding the accounts receivables of the entity. Accounts receivables represent transactions regarding the billing of customers that owe money to an entity. A/R database 36 includes any suitable database that stores accounting information. A/R database 36 may organize the information in any suitable manner. For example, A/R database 36 may organize the information according to the customer or according to the age of the transaction.

Revenue database 38 stores information regarding the revenue of an entity. Revenue database 38 includes any suitable database that stores revenue information. Revenue database 38 may organize the revenue information in any suitable manner. For example, revenue database 38 organizes the revenue based on the revenue type, such as current revenue 40 and deferred revenue 42.

In operation, order entry database 30 and A/R database 36 provide information to RRM application 24 for RRM application 24 to use in implementing the RRM. RRM application 24 performs the various processes and determines whether to recognize revenue. RRM application 24 recognizes the revenue as current or deferred revenue and updates general ledger 22. For example, if current revenue is recognized, RRM application 24 updates current revenue 40, and if deferred revenue is recognized, RRM application 24 updates deferred revenue 42.

Modifications, additions, or omissions may be made to ERP module 18. For example, ERP module 18 may include other databases, such as a purchasing database, a sales database, a licensing database, a maintenance database, or a services database that provide inputs to order entry database 30. As another example, the databases may be organized in any suitable manner. Moreover, the operations of ERP module 18 may be performed by more, fewer, or other components. Any suitable logic comprising software, hardware, other logic, or any suitable combination of the preceding may perform the functions of ERP module 18.

FIG. 3 is a flowchart 300 illustrating implementation of the RRM by RRM application 24. RRM application 24 receives rules and parameters for the entity at step 302. The rules and parameters serve as the general framework within which RRM application 24 operates. At step 304, RRM application 24 determines whether a new transaction is entered into ERP module 18. Transactions may be entered automatically from endpoints 12, such as a POS or manually. If ERP module 18 does not have a new transaction, RRM application 24 continues to monitor ERP module 18 for new transactions. If ERP module 18 does have a new transaction, RRM application 24 receives information related to the transaction at step 306.

RRM application 24 receives the information from ERP module 18. The basic information may include any suitable type of information that properly identifies the transaction. For example, basic information may include customer name, customer identification number, transaction date, amount, products and/or services, current date, a description of the transaction, customer type, agreement type, or other suitable information. Retrieving the basic information from ERP module 18 saves significant time and effort, rather than manually duplicating the information for RRM application 24 to use.

Figure 4:
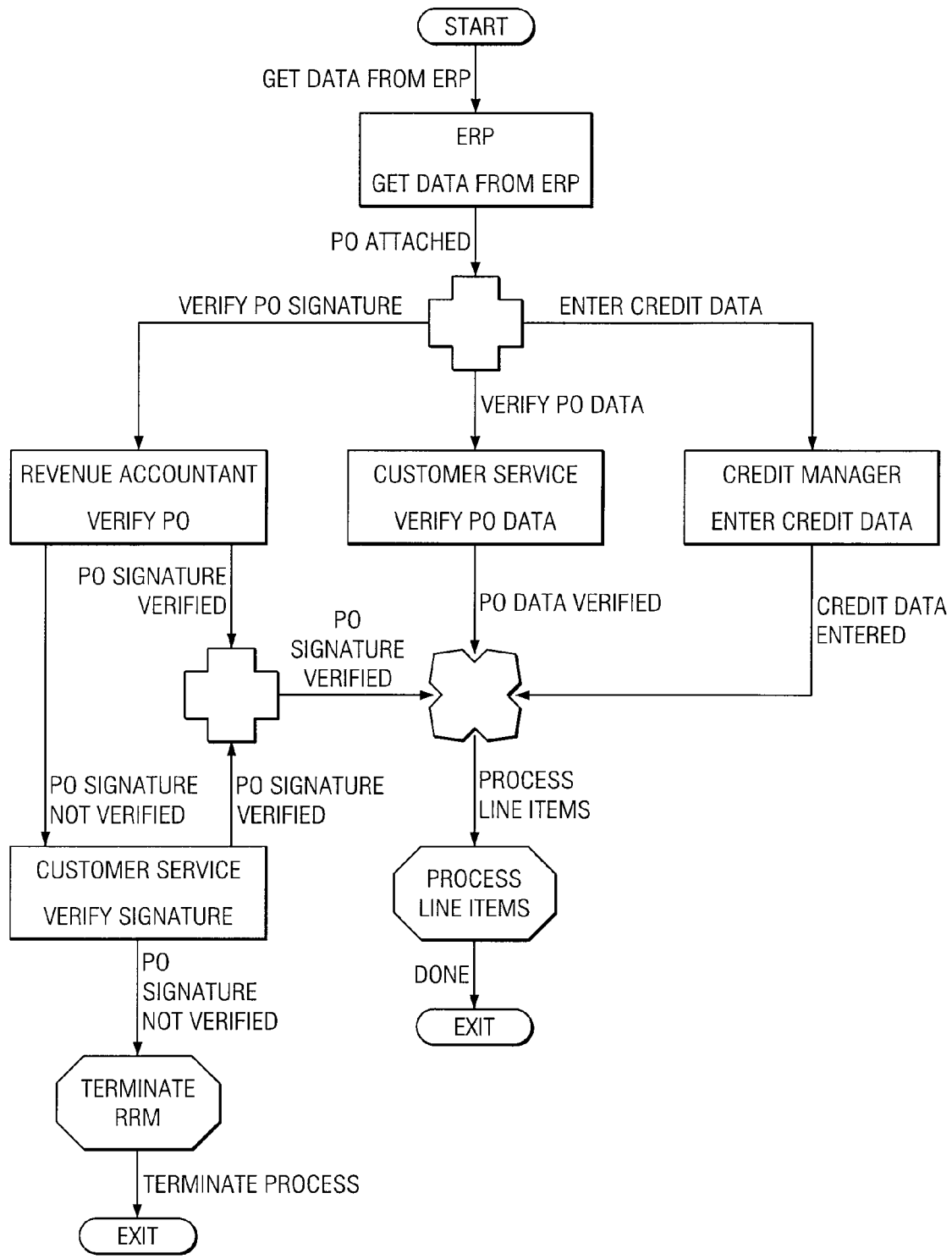
FIG. 4 is a flowchart illustrating verifications the system receives from users in an entity.

RRM application 24 also receives inputs, also referred to as verifications 21, to verify the information received from ERP module 18 at step 307. FIG. 4 below illustrates a more detailed flowchart of the verification process. In an embodiment, these verifications 21 include information from a customer service representative, information from a revenue accountant, and information from an account manager or credit account manager. For example, a revenue accountant may verify a signature is by an authorized person on the transaction. A customer service representative may verify the accuracy, completeness, and validity of the transaction. Also, a credit account manager may verify the payment terms and credit worthiness of the customer associated with the transaction. RRM application 24 determines the appropriate user(s) in the entity to verify the information and the user(s) can access the information from one or more endpoints 12. RRM application 24 may identify more than one user to verify different types of information and may communicate the different types of information simultaneously to the users. Any one of these identified user(s) can take the desired action based on this information to move the process forward. RRM application 24 may communicate the information according to pre-set timers and/or actions taken by users as part of the RRM process.

Upon receiving verifications 21 or while still awaiting verifications 21, RRM application 24 provides questions 26 to various departments regarding the transaction at step 308. For example, the sales department handles questions 26 regarding data activity of the transaction, such as special terms, estimated start and completion dates, special contingencies, or related transactions. The technical services department may handle consulting data activity, such as providing information regarding training and installation. Also, the customer service department may verify the specific information of the transaction, such as accurate pricing, correct descriptions, correct shipping information and delivery instructions, and the customer's right to use the product or service. If system 10 does not receive a response for each question 26 as determined at step 310, the method determines at step 312 whether to terminate RRM application 24. If RRM application 24 does not terminate, the method continues from step 310 until each response is received. Otherwise, RRM application 24 terminates and the method ends.

Figure 6:
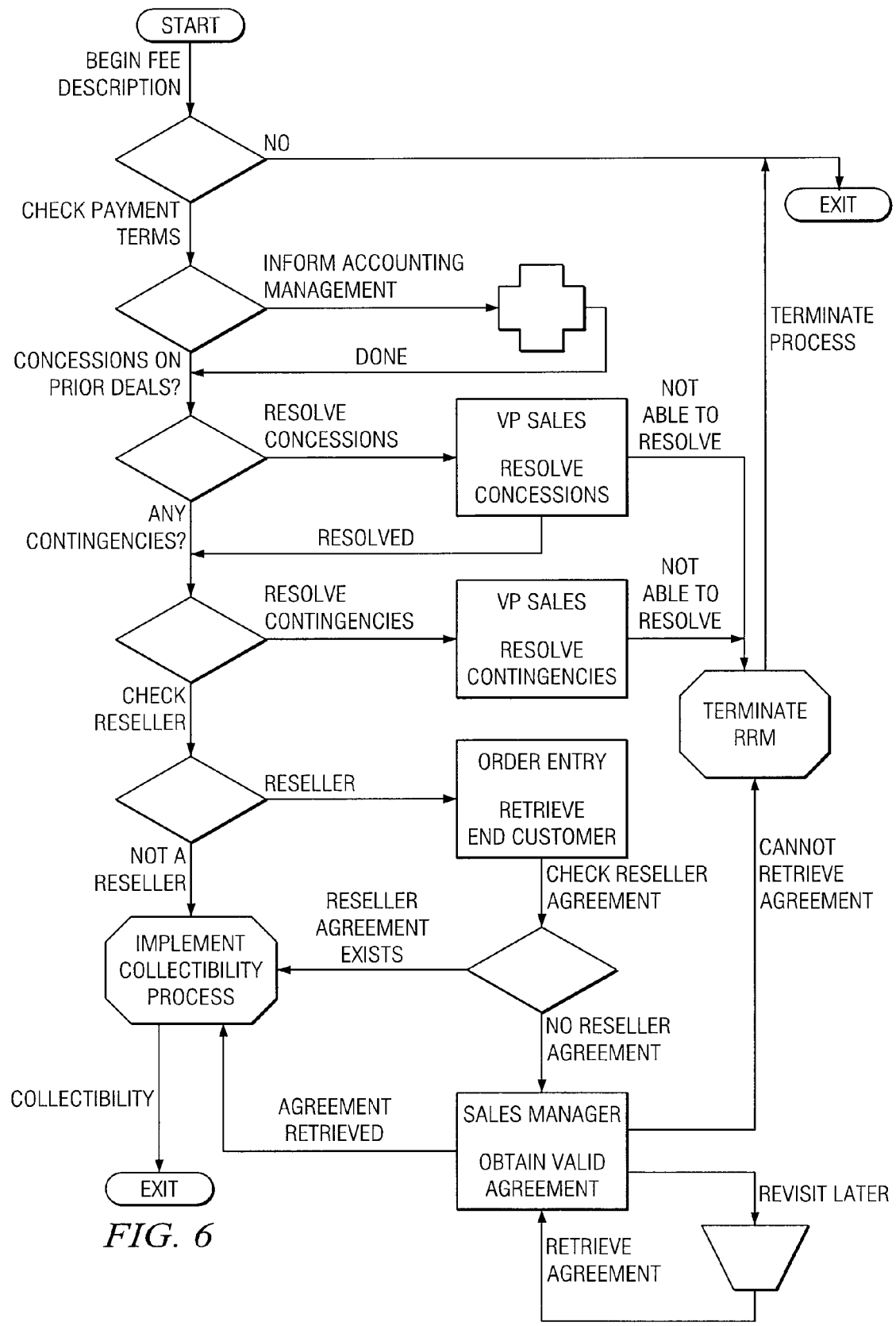
FIG. 6 is a flowchart illustrating a fee description process of the revenue recognition model.

If RRM application 24 receives a response to each question 26, the method continues from step 314 where RRM application 24 implements a fee description process, as described in FIG. 6. The fee description process includes any suitable process that determines the fees involved in the transaction. For example, system 10 determines a fee type, resolves any contingency surrounding the fee, and applies any concessions. The fee description process also considers the type of customer involved in the transaction. For example, if the customer is an end-user, the method continues. If the customer is a reseller or distributor, the method may not continue until the reseller or distributor makes a binding sale to an end-user.

Figure 7:
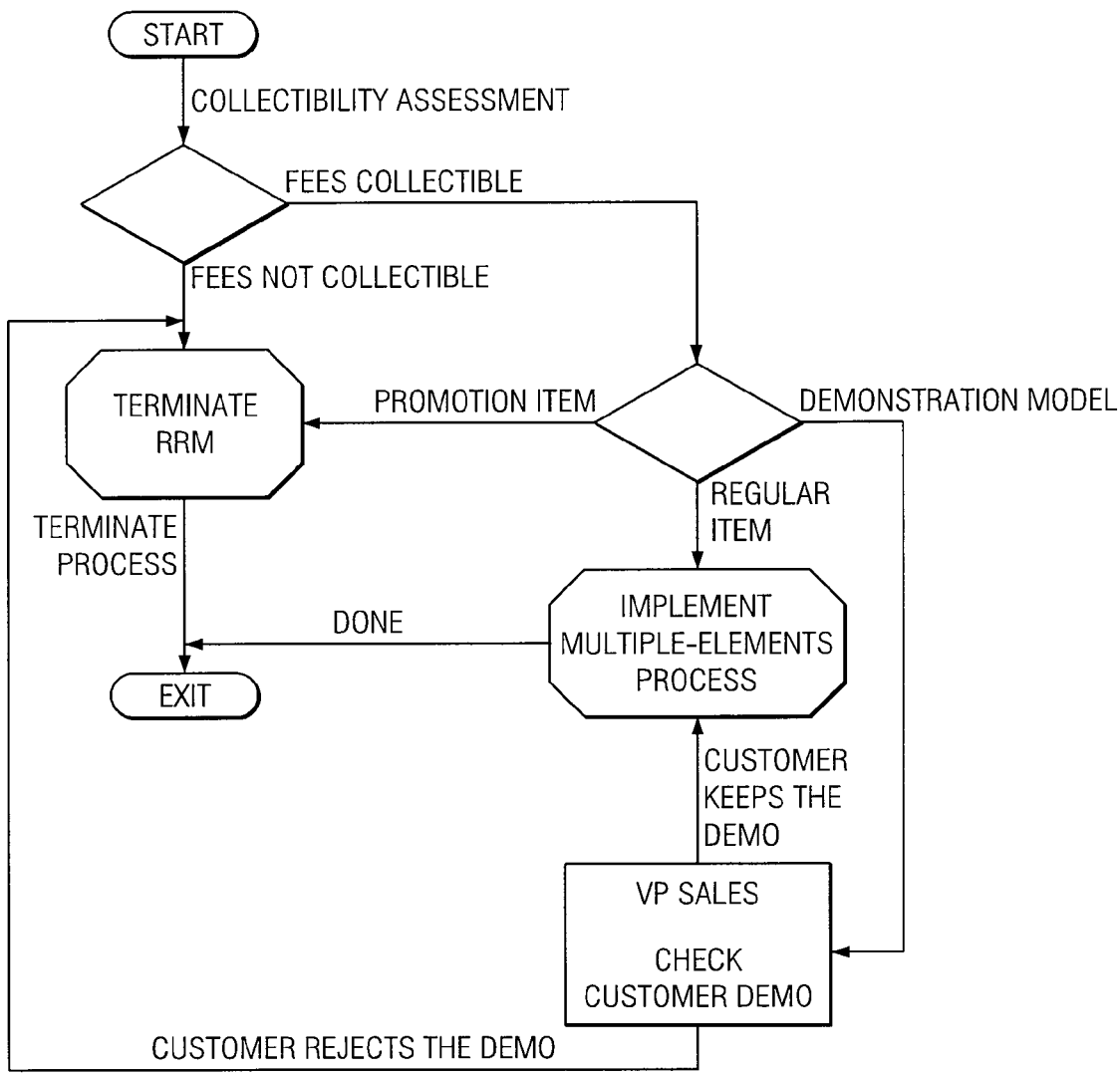
FIG. 7 is a flowchart illustrating a collectibility process of the revenue recognition model.

RRM application 24 also implements a collectibility process at step 316. The collectibility process includes determining whether the customer is creditworthy and reliable and whether the nature of the transaction would provide for recognizing revenue. FIG. 7, below, illustrates the collectibility process in further detail.

Figure 8:
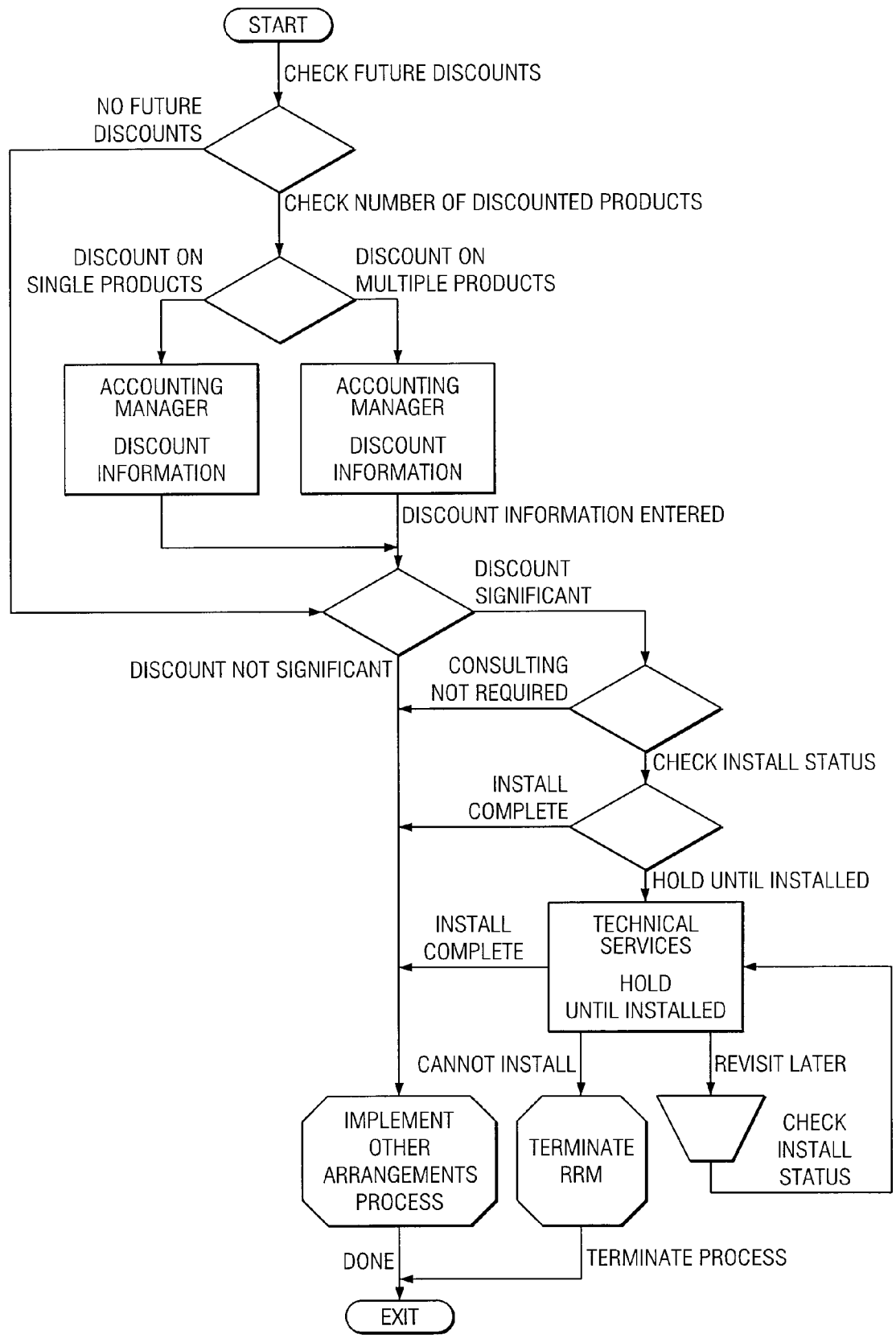
FIG. 8 is a flowchart illustrating a multiple-elements process of the revenue recognition model.

The multiple-elements process is implemented at step 318. FIG. 8 illustrates the multiple-elements process in further detail. The multiple-elements process considers any discounts applied to the transaction. The process considers various aspects of the discount, such as the percentage of the discount. A sub-process also considers whether the transaction involves a barter, as described with respect to FIG. 10. A barter is the non-monetary exchange of goods and/or services. If the transaction includes a barter, additional processes are implemented to determine whether to recognize revenue.

At step 320, RRM application 24 determines whether current revenue is recognized according to the above processes, which include receiving verifications 21 and receiving a response to each question 26 to confirm the existence of an arrangement or contract and to confirm delivery of the product has occurred or services have been rendered, verifying the fee, implementing the collectibility process, and implementing the multiple-elements process. If current revenue is recognized, RRM application 24 requests approval to recognize the revenue in general ledger 22 at step 321. System 10 determines whether approval is received from a user at step 322. If the user approves the recognition of revenue, RRM application 24 updates general ledger 22 at step 324. For example, RRM application 24 updates current revenue 40 in revenue database 38 to include the revenue and removes the transaction from A/R database 36. If the user does not approve the recognition of revenue, the application ends.

If RRM application 24 does not recognize current revenue at step 320, RRM application 24 determines whether deferred revenue is recognized at step 326. If no deferred revenue is recognized, the application ends. The process continues from step 322 when deferred revenue is recognized. At step 322, a user determines whether to approve the recognition of the deferred revenue. RRM application 24 updates general ledger 22 at step 324 if an approval is received or ends the application if an approval is not received. Updating general ledger 22 to include deferred revenue may include updating deferred revenue 42 in revenue database 38 to include the deferred revenue and removing the transaction from A/R database 36.

Modifications, additions, or omissions may be made to flowchart 300. For example, timers may be initiated throughout the process to remind the user to answer questions 26 or provide information for the RRM to continue. As another example, each process described in the RRM may determine any suitable information to allow for an accurate recognition of revenue. As yet another example, any suitable component may implement RRM application 24 and perform any or all of the steps of the application. Although described in a particular sequence, flowchart 300 may perform steps serially or in parallel in any suitable order.

FIGS. 4-12 illustrate detailed flowcharts that the RRM may implement. Any suitable component of system 10 may implement the steps as illustrated in FIGS. 4-12. Although described in a particular sequence, system 10 may perform the steps of the flowcharts serially or in parallel and in any suitable order.

FIG. 4 is a flowchart illustrating verifications 21 system 10 receives from users in an entity. RRM application 24 gets data from ERP module 18 regarding a transaction, received as a purchase order (PO). Various users in the entity verify information in the PO. A revenue accountant may verify the signature on the PO, a customer service representative may verify the PO data, and a credit manager may enter the credit information associated with the PO. When the information is verified and entered, system 10 processes the line items in the PO and continues with the implementation of RRM application 24. If the information is not verified, such as the signature on the PO, system 10 terminates RRM application 24.

Figure 5A:
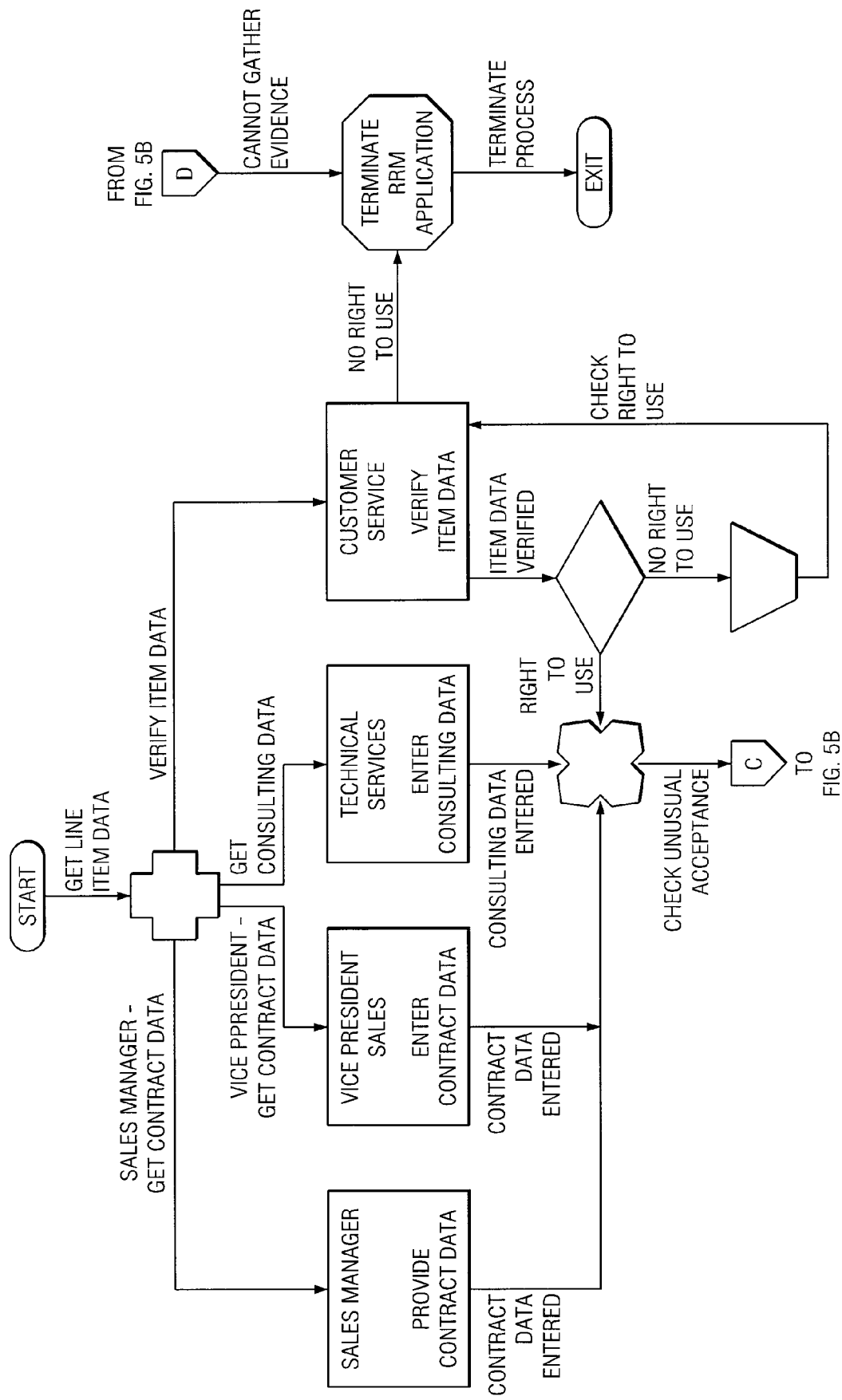
FIG. 5 is a flowchart illustrating an evidence of arrangement process of the revenue recognition model.
Figure 5B:
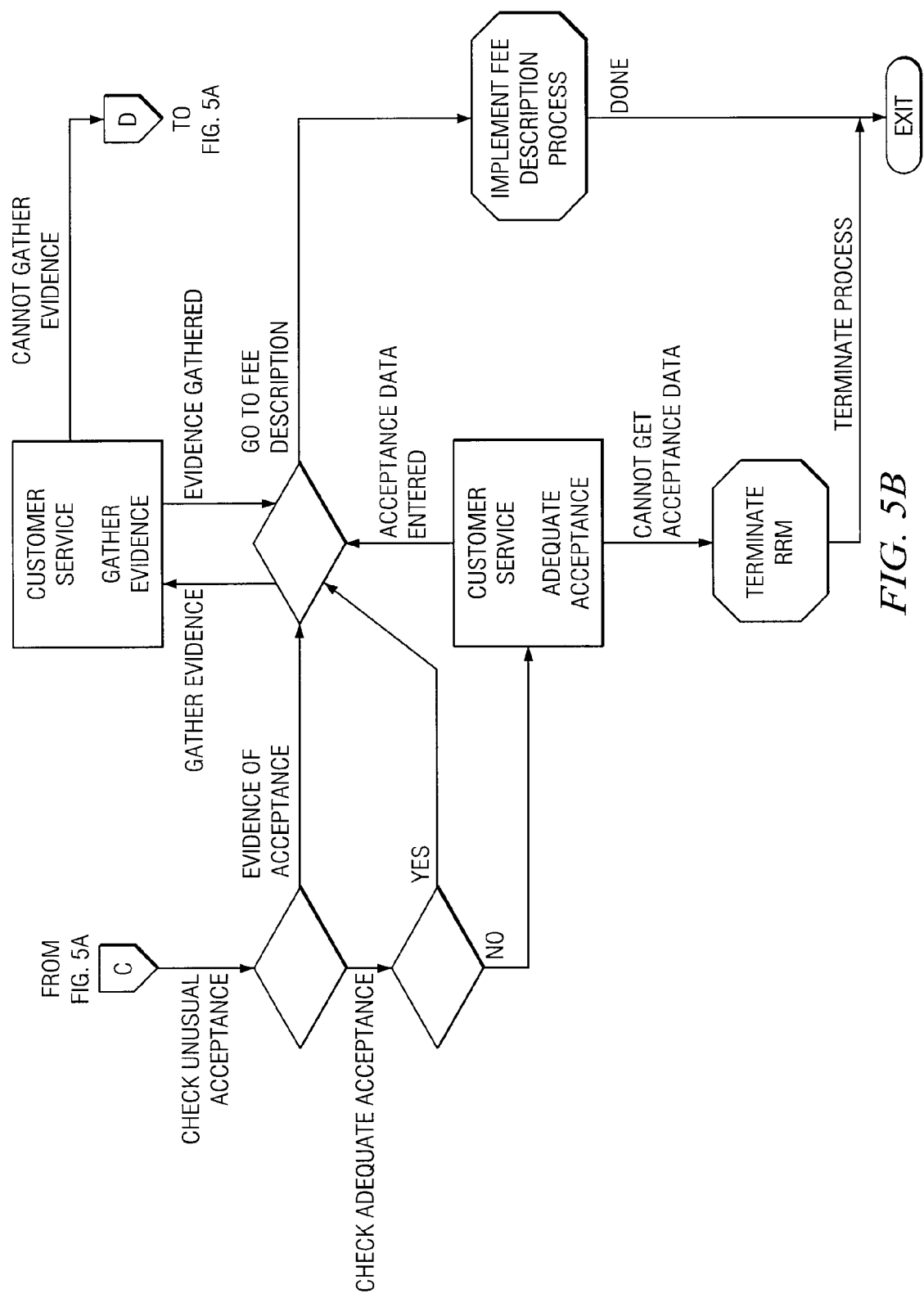

FIG. 5 is a flowchart illustrating an evidence of arrangement process of the RRM. The evidence of arrangement process confirms that a transaction exists. Various users in the entity provide information regarding the transaction. For example, a sales manager may provide transaction data, a vice-president of sales may enter the contract data, a technical services representative may enter consulting data, and a customer service representative may verify the transaction data. If the information is properly entered and there is an evidence of acceptance of the transaction, the process continues to a fee description process as described in FIG. 6. However, if there is no evidence of acceptance or there is not a right-to-use, RRM application 24 may terminate.

FIG. 6 is a flowchart illustrating a fee description process of the RRM. During the fee description process, system 10 determines the fees of the transaction, including determining whether any concessions or contingencies exist. The fee description process is a sub-process of the evidence of acceptance process. A user in the entity may resolve the concessions and contingencies, such as a vice-president of sales. If system 10 cannot resolve the concessions or contingencies, RRM application 24 terminates. Otherwise, the fee description process continues by determining the type of customer involved in the transaction, such as a reseller, an end-user, or other suitable customer. If the customer is not a reseller or a reseller agreement exists for a reseller, the process continues to a collectibility process.

FIG. 7 is a flowchart illustrating a collectibility process of the RRM, which is a sub-process of the fee description process. During the collectibility process, system 10 determines whether an entity may reasonably rely on a customer to fulfill the terms of the transaction. If system 10 determines the fees are not collectible, RRM application 24 terminates. Otherwise, system 10 implements the multiple-elements process.

FIG. 8 is a flowchart illustrating a multiple-elements process of the RRM. During the multiple-elements process, system 10 determines whether discounts are applied to the transaction. The process determines the number of products to which a discount applies and gathers discount information. Following this process, system 10 implements an other arrangements process.

Figure 9:
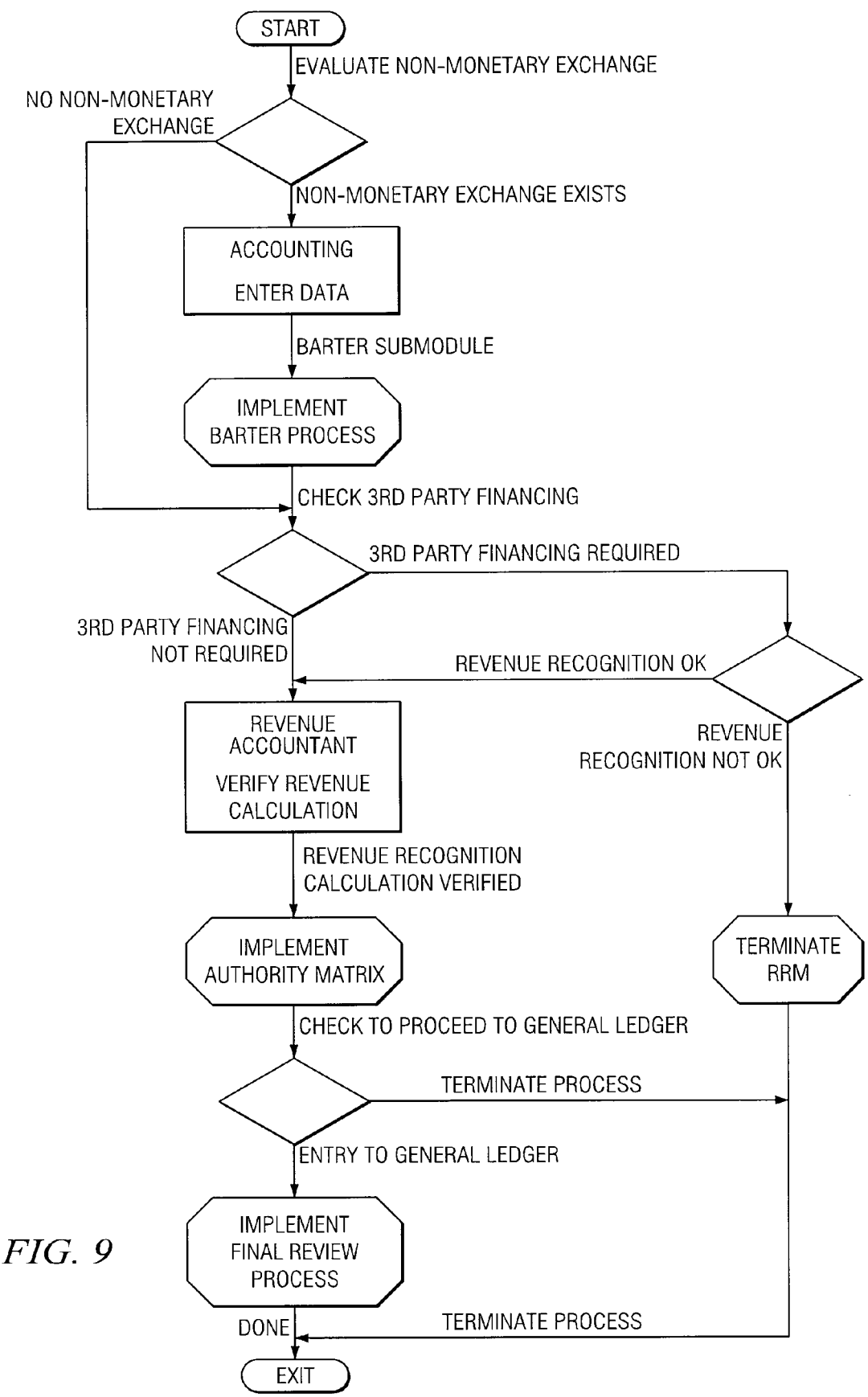
FIG. 9 is a flowchart illustrating an other arrangements process of the revenue recognition model.
Figure 10:
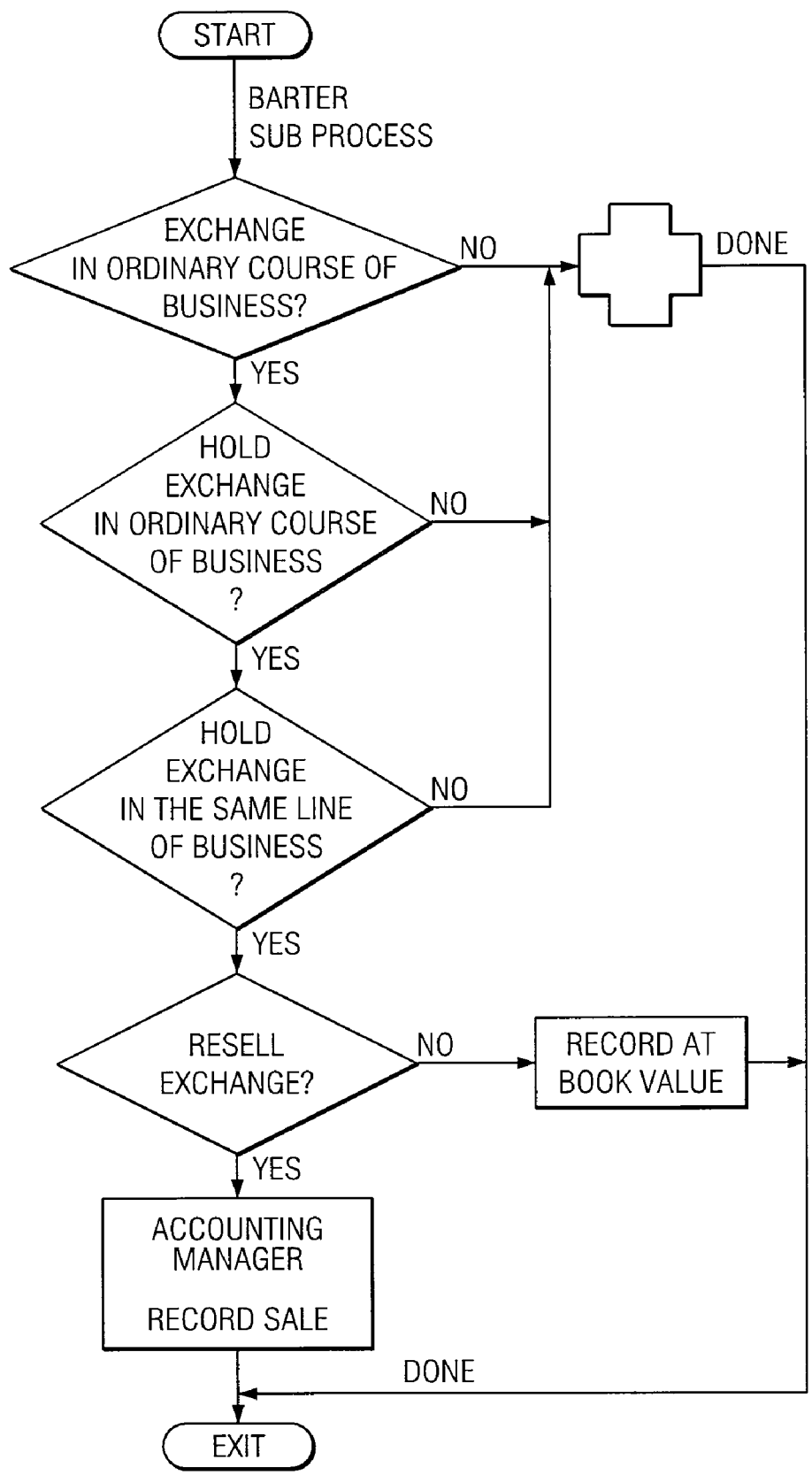
FIG. 10 is a flowchart illustrating a barter process of the revenue recognition model.

FIG. 9 is a flowchart illustrating an other arrangements process. During the other arrangements process, system 10 determines whether miscellaneous arrangements exist. For example, if a barter arrangement exists, a barter process, as described with respect to FIG. 10, is implemented. As another example, the other arrangements process implements an authority matrix, as described in FIG. 11, to verify the revenue recognized. As yet another example, the other arrangements process implements the final review process, as described in FIG. 12, to finally review the recognizable revenue before entry into general ledger 22. As depicted in FIG. 9, system 10 may terminate RRM application 24 during the other arrangements process.

FIG. 10 is a flowchart illustrating a barter process. The process determines whether the transaction involves a non-monetary exchange. Even if the transaction is a barter, revenue may still be recognizable. System 10 implements this process to determine whether a non-monetary exchange may involve recognizable revenue.

Figure 11A:
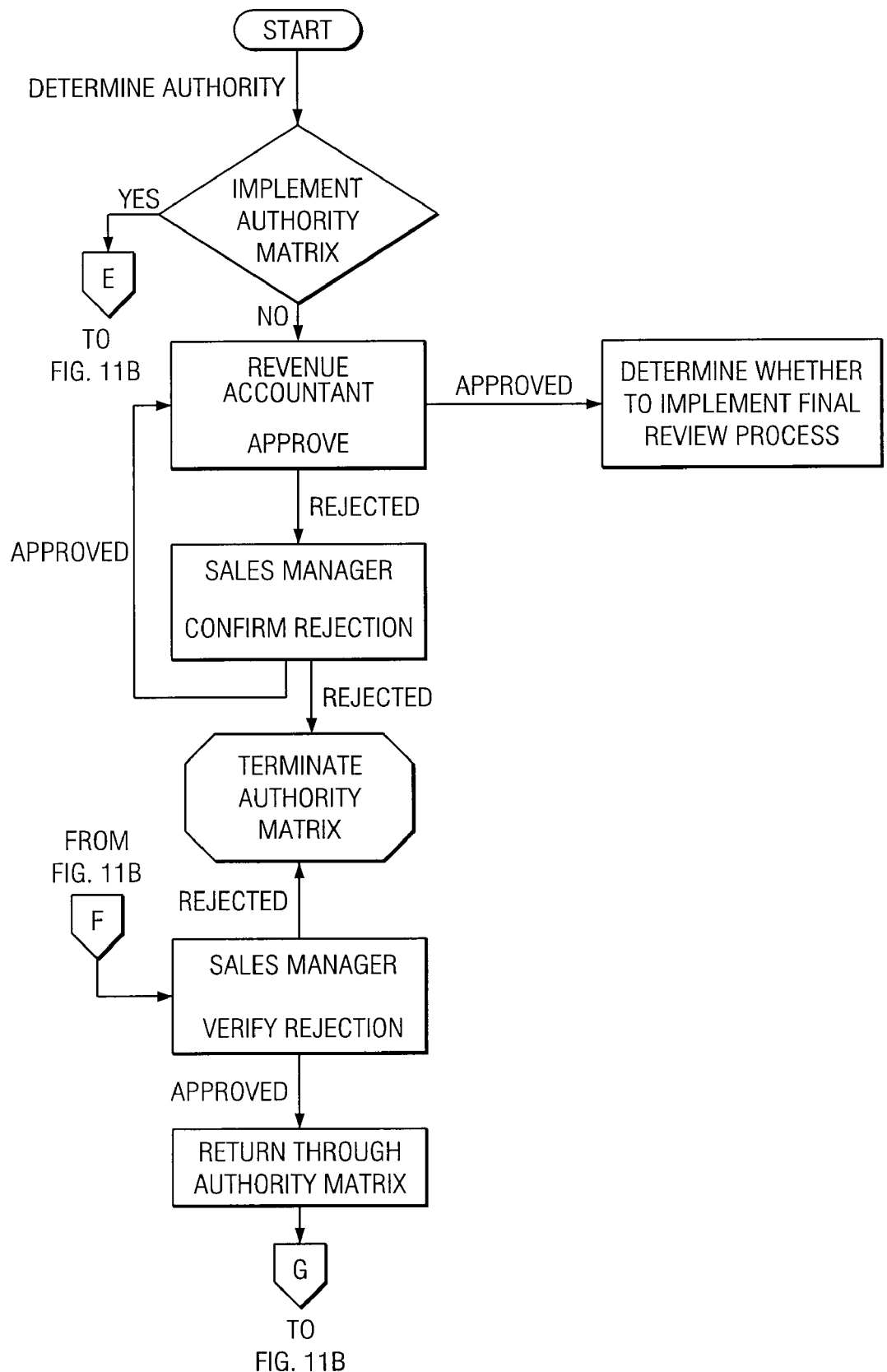
FIG. 11 illustrates an authority matrix the system implements to determine whether to continue with the process of updating a general ledger.

FIG. 11 illustrates an authority matrix system 10 implements to determine whether to continue with the process of updating general ledger 22. System 10 may implement the authority matrix for any suitable reason and using any suitable technique. If system 10 does not implement the authority matrix, a revenue accountant may approve or reject whether to recognize the revenue. However, if the system implements the authority matrix, various users within the entity approve or reject the recognition of revenue. Depending on the amount of the transaction, senior personnel within the entity may approve the transaction. For example, if the transaction is less than $1000, only the approval of an accountant may be needed. Alternatively, if the transaction is more than $1000, the approval of a senior accountant in addition to the accountant is needed. This process through the authority matrix may continue for transactions surpassing $1 Million. If the revenue is recognizable, system 10 determines whether to implement the final review process, as described in FIG. 12. If any user rejects the transaction, a sales manager verifies the rejection. If the sales manager agrees with the rejection, the authority matrix terminates. If the sales manager overrides the rejection and approves the transaction, the transaction returns through the authority matrix.

Figure 12:
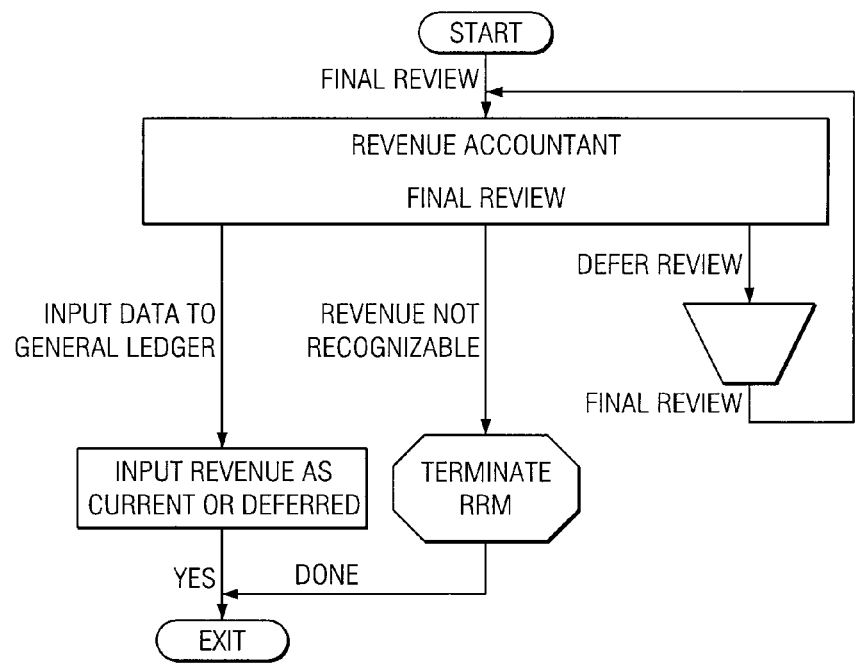
FIG. 12 is a flowchart illustrating final review of recognizable revenue.

FIG. 12 is a flowchart illustrating final review of recognizable revenue. A revenue accountant reviews the recognizable revenue. The revenue accountant may review immediately when the review is requested, or defer review until a later time. When the revenue accountant reviews the recognizable revenue, the accountant confirms whether to recognize the revenue and update general ledger 22 or determines that the revenue is not recognizable. If the revenue is not recognizable, RRM application 24 terminates. If the revenue is recognizable, system 10 updates general ledger 22.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for implementing a revenue recognition model in an automated environment, comprising:
   receiving rules associated with an entity, the rules received at a financial computing system via a communications network to which the financial computing system is coupled;
   receiving information associated with a transaction at the financial computing system;
   determining a user of the financial computing system to respond to one or more questions associated with the transaction;
   communicating, over the communications network, the one or more questions to the user;
   receiving a response to one or more of the questions from the user at the financial computing system;
   communicating information associated with the transaction for a user to verify;
   receiving verifications;
   implementing, at the revenue recognition module of the financial computing system, one or more automated processes to determine whether revenue from the transaction is recognizable based on the received information associated with the transaction and the received response to one or more of the questions;
   if revenue is recognizable, removing the transaction from an accounts receivable module of the financial computing system;
   recognizing the revenue as current revenue if the entity has earned a payment for the transaction;
   recognizing the revenue as deferred revenue if the entity has not earned the payment for the transaction; and updating a general ledger of the financial computing system to reflect revenue of the transaction as a selected one of current revenue and deferred revenue.

2. The method of claim 1, wherein updating a general ledger comprises updating at least one of a current revenue module and a deferred revenue module.

3. The method of claim 1, further comprising, if revenue is recognizable:
    determining a user to approve a recognition of the revenue;
    communicating an approval request; and
    receiving an approval response.

4. The method of claim 1, wherein implementing one or more automated processes comprises:
    implementing a first process to determine fees of the transaction;
    implementing a second process to determine whether the entity can collect on the transaction; and
    implementing a third process to determine whether discounts are applied to the transaction.

5. The method of claim 1, further comprising receiving one or more verifications associated with the transaction, each verification associated with a user familiar with the transaction.

6. The method of claim 1, further comprising:
    determining a user in the entity to verify the information;
    communicating, over the communications network, information associated with the transaction for a user to verify; and
    receiving verifications.

7. The method of claim 1, further comprising:
    setting a timer in which to receive the response to each question within a time limit;
    determining the response is not received within the time limit; and
    presenting the question to the user.

8. The method of claim 1, further comprising:
    receiving verifications asynchronously; and
    receiving a response to one or more questions asynchronously.

9. Software embodied in a computer readable medium for implementing a revenue recognition model in an automated environment, the software operable to:
    receive rules, over a communications network, associated with an entity;
    receive information associated with a transaction;
    determine a user in the entity to respond to one or more questions associated with the transaction;
    communicate, over the communications network, the one or more questions; and
    receive a response to each question;
    communicate information associated with the transaction for a user to verify;
    receive verifications;
    implement one or more automated processes to determine whether revenue from the transaction is recognizable;
    if revenue is recognizable, remove the transaction from an accounts receivable module;
    recognize the revenue as current revenue if the entity has earned a payment for the transaction;
    recognize the revenue as deferred revenue if the entity has not earned the payment for the transaction; and
    update a general ledger to reflect revenue of the transaction as a selected one of current revenue and deferred revenue.

10. The software of claim 9, wherein updating a general ledger comprises updating at least one of a current revenue module and a deferred revenue module.

11. The software of claim 9, the software further operable to, if revenue is recognizable:
    determine a user to approve a recognition of the revenue;
    communicate an approval request; and
    receive an approval response.

12. The software of claim 9, wherein implementing one or more automated processes comprises:
    implementing a first process to determine fees of the transaction;
    implementing a second process to determine whether the entity can collect on the transaction; and
    implementing a third process to determine whether discounts are applied to the transaction.

13. The software of claim 9, the software further operable to receive one or more verifications associated with the transaction, each verification associated with a user familiar with the transaction.

14. The software of claim 9, the software further operable to:
    determine a user in the entity to verify the information;
    communicate, over the communications network, information associated with the transaction for a user to verify; and
    receive verifications.

15. The software of claim 9, the software further operable to:
    set a timer in which to receive the response to each question within a time limit;
    determine the response is not received within the time limit; and
    present the question to the user.

16. The software of claim 9, the software further operable to:
    receive verifications asynchronously; and
    receive a response to one or more questions asynchronously.

17. A system for implementing a revenue recognition model in an automated environment, comprising:
    means for receiving rules, over a communications network, associated with an entity;
    means for receiving information associated with a transaction;
    means for determining a user in the entity to respond to one or more questions associated with the transaction;
    means for communicating, over the communications network, the one or more questions; and
    means for receiving a response to each question;
    means for communicating information associated with the transaction for a user to verify;
    means for receiving verifications;
    means for implementing one or more automated processes to determine whether revenue from the transaction is recognizable;
    means for removing the transaction from an accounts receivable module if revenue is recognizable;
    means for recognizing the revenue as current revenue if the entity has earned a payment for the transaction;
    means for recognizing the revenue as deferred revenue if the entity has not earned the payment for the transaction; and
    means for updating a general ledger to reflect revenue of the transaction as a selected one of current revenue and deferred revenue.

* * * * *